United States Patent [19]

Hyuga et al.

[11] Patent Number: 5,287,381
[45] Date of Patent: Feb. 15, 1994

[54] LASER-DIODE-PUMPED SOLID-STATE LASER

[75] Inventors: Hiraoki Hyuga; Yoji Okazaki, both of Kanagawa, Japan

[73] Assignee: Fuji Photo Film Co., Ltd., Kanagawa, Japan

[21] Appl. No.: 849,299

[22] Filed: Mar. 11, 1992

[30] Foreign Application Priority Data

Mar. 12, 1991 [JP] Japan ................................ 3-46896

[51] Int. Cl.$^5$ ............................................. H01S 3/091
[52] U.S. Cl. ......................................... 372/75; 372/71; 372/70; 372/21; 372/22
[58] Field of Search ................. 372/75, 71, 69, 70, 372/21, 22

[56] References Cited

U.S. PATENT DOCUMENTS

| | | | |
|---|---|---|---|
| 4,791,631 | 12/1988 | Baumer et al. | 372/22 |
| 4,809,291 | 2/1989 | Byer et al. | 372/75 |
| 4,884,277 | 11/1989 | Anthon et al. | 372/22 |
| 4,884,281 | 11/1989 | Hawthorn et al. | 372/75 |
| 4,953,166 | 8/1990 | Mooradian | 372/21 |

FOREIGN PATENT DOCUMENTS 62-189783 8/1987 Japan .

OTHER PUBLICATIONS

"Laser Research", vol. 18, No. 8 (1990), pp. 87–99.
"Laser/Atomic Oscillator and Ultimate Light Quantum Engineering", E-2 (1990), p. 56.
"IEEE Journal of Quantum Electronics", vol. 26, No. 9 (1990), pp. 1457–1459.
"OPTRONICS"(1990), No. 12, pp. 55–61.

*Primary Examiner*—Georgia Y. Epps
*Attorney, Agent, or Firm*—Sughrue Mion Zinn Macpeak & Seas

[57] ABSTRACT

A laser-diode-pumped solid-state laser includes a semiconductor laser for emitting a pumping laser beam, a solid-state laser crystal of an ion crystal of a paramagnetic substance doped with neodymium, for producing a laser beam in response to being pumped by said pumping laser beam, a resonator for oscillating the laser beam produced by said solid-state laser crystal, and an optical wavelength converter in said resonator for converting the wavelength of the oscillated laser beam into another wavelength. The solid-state laser crystal has a neodymium ion concentration higher than 3 at %. The solid-state laser oscillates stably in a single longitudinal mode at all times to produce a highly intensive laser beam of short wavelength.

4 Claims, 3 Drawing Sheets

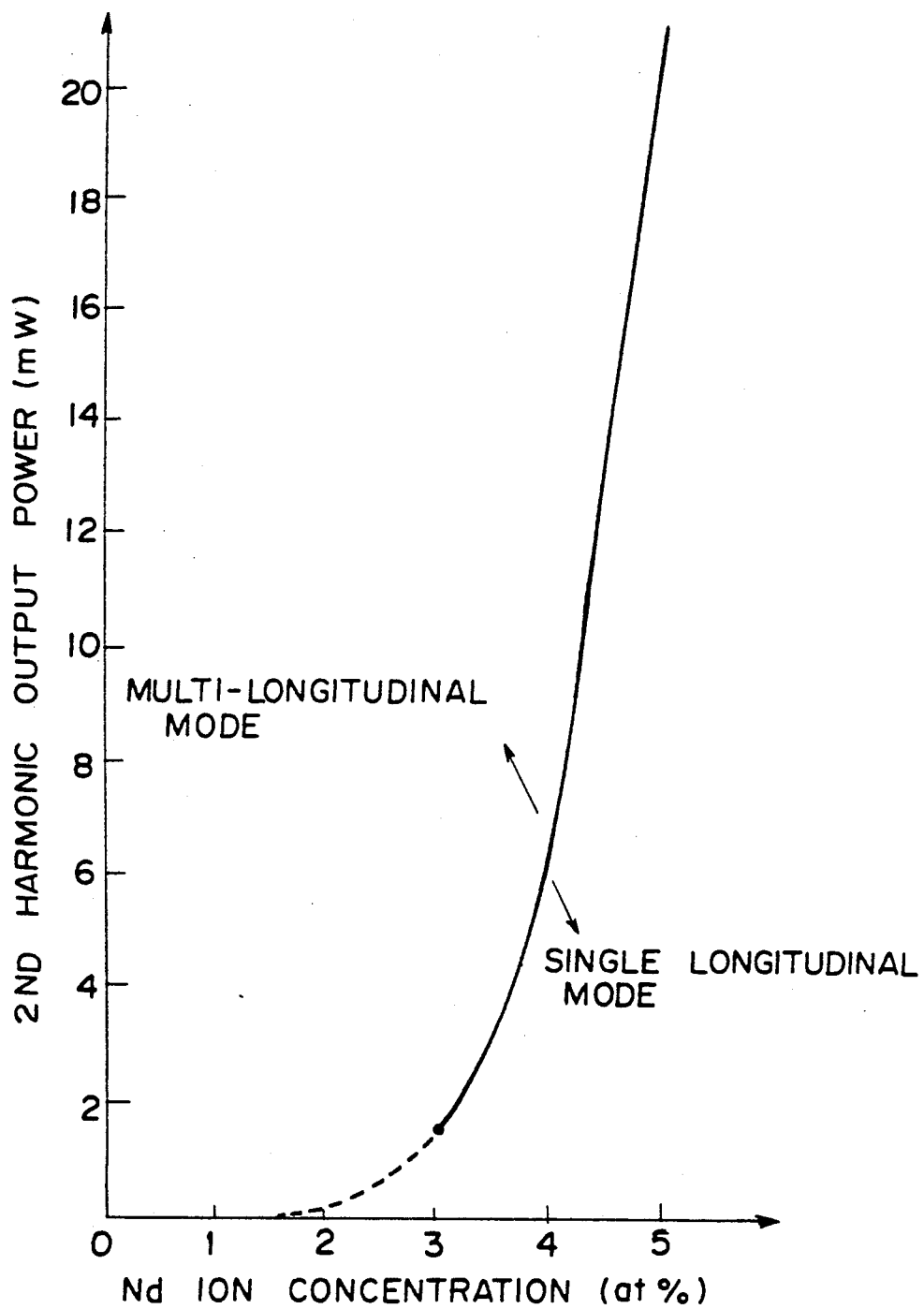

LASER-DIODE-PUMPED SOLID-STATE LASER

BACKGROUND OF THE INVENTION

1. Field of the Invention

The present invention relates to a laser-diode-pumped solid-state laser having a solid-state laser crystal that is pumped by a semiconductor laser in the form of a laser diode, and more particularly to a laser-diode-pumped solid-state laser having a wavelength conversion capability.

2. Description of the Prior Art

Japanese Unexamined Patent Publication No. 62(1987)-189783, for example, discloses a laser-diode-pumped solid-state laser having a solid-state laser crystal doped with a rare-earth element such as neodymium (Nd), the solid-state laser crystal being pumped by a semiconductor laser. One widely used material of the solid-state laser crystal is an ion crystal of a paramagnetic substance such as $YVO_4$, $YAG(Y_3Al_5O_{12})$, or the like that is doped with Nd.

According to one conventional design involving such a laser-diode-pumped solid-state laser, the resonator houses a bulk single crystal of a nonlinear optical material for converting the wave of a solid-laser-oscillated beam into a second harmonic thereby to produce a laser beam of a shorter wavelength, as disclosed in U.S. Pat. No. 5,124,999 and Laser Research, Vol. 18, No. 8 (1990), pages 94–99, for example.

The laser-diode-pumped solid-state laser should preferably be oscillated in a single longitudinal mode in order to suppress output fluctuations due to a longitudinal mode competition. In applications using laser-diode-pumped solid-state lasers, there is a demand for an increase in the pumping intensity of the semiconductor laser for a higher output power.

Laser Research, Vol. 18, No. 8 (1990), page 646, has reported that the wave of an oscillated beam from $Nd:YVO_4$ (with an Nd ion concentration of 1.1 at %) is converted in wavelength into a second harmonic by a KTP crystal disposed in a resonator, the second harmonic having an output power of 12.8 mW in a substantially single longitudinal mode in response to an input power of 760 mW from a semiconductor laser. It has also been reported in the preprint of the symposium Laser/Atomic Oscillator And Ultimate Light Quantum Engineering (sponsored by Applied Physics Society and Quantum Electronics Society), E-2 (1990), page 56 that $Nd:YVO_4$ (with an Nd ion concentration of 2.02 at %) and a KTP crystal having a thickness of 7.0 mm are used to obtain a second harmonic output power of 9.1 mW when the input power from a semiconductor laser is 740 mW.

With the conventional laser-diode-pumped solid-state lasers, however, it is necessary to control the resonator length strictly with a piezoelectric element or the like so as to obtain an output power in the single longitudinal mode. Even if the resonator length slightly varies on account of a temperature change or a mechanical vibration, the oscillation in the single longitudinal mode easily changes to an oscillation in a multi-longitudinal mode, resulting in mode completion noise. Therefore, the conventional laser-diode-pumped solid-state lasers have not been put to practical use because of such a problem.

According to IEEE JOURNAL OF QUANTUM ELECTRONICS, Vol. 26, No. 9 (1990), page 1457, the condition to be met for achieving an oscillation in a single longitudinal mode is given by:

$$Pin/Pth \leq Wth \quad (1)$$

where Pin is the pumping intensity of a semiconductor laser, Pth is the oscillation threshold value of a solid-state laser, and Wth is the threshold value of the relative pumping intensity of an oscillation in a multi-longitudinal mode. Under this condition, the oscillation in the single longitudinal mode is stable even when the resonator length somewhat varies due to a temperature change or a mechanical vibration. For such a stable and practical oscillation in the single longitudinal mode, the pumping intensity of the semiconductor laser has to be set to a level lower than a certain upper limit. Since, however, the upper limit for the pumping intensity in the conventional laser-diode-pumped solid-state laser is relatively low, it has been difficult for the laser-diode-pumped solid-state laser to meet both requirements for a stable oscillation in a single longitudinal mode and a higher output power. The conventional difficulty in meeting those requirements will be described below.

The threshold value Wth in the equation (1) above increases with the pumping optical absorption coefficient $\alpha$ of a solid-state laser crystal. Inasmuch as the optical absorption coefficient $\alpha$ is proportional to the Nd ion concentration, it is effective to increase the Nd ion concentration for increasing the threshold value Wth to achieve an increase in an upper-limit pumping intensity Pin for a stable oscillation in the single longitudinal mode.

If the Nd ion concentration is increased, however, the oscillation threshold value may often increase due to concentration quenching, with the result that the solid-state laser crystal may either fail to oscillate or may produce an extremely small output power upon oscillation. A resonator loss L of a solid-state laser crystal and an oscillated beam intensity Pc of the solid-state laser crystal are related to each other as follows:

$$Pc \propto (Pin - Pth)/L \quad (2)$$

The fluorescence lifetime $\tau$ of the solid-state laser crystal and the cross-sectional area $\sigma$ for stimulated emission are related to the oscillation threshold value Pth as follows:

$$Pth \propto L/(\sigma\tau) \quad (3)$$

The fluorescence lifetime $\Delta$ and the fluorescence intensity (which is proportional to $\sigma\tau$) are related to the Nd ion concentration in $Nd:YVO_4$ as shown in FIG. 3 of the accompanying drawings, which is cited from OPTRONICS (1990), No. 12, page 60. It is known that the illustrated relationship holds true for other ion crystals of paramagnetic substances. As shown in FIG. 3, if the Nd ion concentration exceeds 1 at % in the ion crystals of paramagnetic substances, the value of $\sigma\tau$ sharply drops due to concentration quenching. Then, as can be understood from the equation (3) above, the oscillation threshold value Pth increases to a value higher than, or very close to, the pumping intensity Pin. As a result, the oscillated beam intensity Pc may become zero or extremely small, as can be seen from the equation (2).

Because of such a phenomenon, the Nd ion concentration in the ion crystals of paramagnetic substances should optimally be in the order of 1 at % as described in OPTRONICS and Laser Research, Vol. 18, No. 8 (1990), page 646, as referred to above. A maximum possible value of 3 at % for the Nd ion concentration is only reported in IEEE JOURNAL OF QUANTUM ELECTRONICS, Vol. 26, No. 9 (1990), page 1457.

Heretofore, the Nd ion concentration has been set to a value less than 3 at %, usually of about 1 at %. Consequently, the optical absorption coefficient $\alpha$ is relatively small, and the threshold value Wth is of a small value of at most 7. Therefore, as can be seen from the equation (1), the pumping intensity Pin must be reduced to enable a solid-state laser to oscillate in a single longitudinal mode. The oscillated beam intensity Pc of the beam from the solid-state laser that oscillates in the single longitudinal mode is also relatively low.

The technical limitation that the Nd ion concentration is preferably of about 1 at % or at most 3 at % has been widely accepted with respect to all laser-diode-pumped solid-state lasers which employ ion crystals of paramagnetic substances. Accordingly, it has been difficult for the laser-diode-pumped solid-state lasers to meet both requirements for a stable oscillation in a single longitudinal mode and a higher output power in applications to obtain short-wavelength laser beams through wavelength conversion.

SUMMARY OF THE INVENTION

In view of the aforesaid drawbacks of the conventional laser-diode-pumped solid-state lasers, it is an object of the present invention to provide a laser-diode-pumped solid-state laser which can oscillate stably in a single longitudinal mode at all times and produce a highly intensive laser beam of short wavelength.

According to the present invention, there is provided a laser-diode-pumped solid-state laser comprising a semiconductor laser for emitting a pumping laser beam, a solid-state laser crystal of an ion crystal of a paramagnetic substance doped with neodymium, for producing a laser beam in response to being pumped by the pumping laser beam, a resonator for oscillating the laser beam produced by the solid-state laser crystal, and an optical wavelength converter in the resonator for converting the wavelength of the oscillated laser beam into another wavelength, the solid-state laser crystal having a neodymium ion concentration higher than 3 at %.

The inventors have found that if an optical wavelength converter is disposed in a resonator and a laser beam oscillated by a solid-state laser is picked up from the resonator after having been converted in wavelength, then it is more unlikely for the solid-state laser to fail to either oscillate or produce an extremely small output power when oscillated even though the Nd ion concentration is high, than otherwise. More specifically, if a laser beam oscillated by a solid-state laser were directly picked up from a resonator, an exit resonator mirror would have to have a reflectivity of about 95% with respect to the oscillated laser beam, and hence a resonator loss L would normally be about 6%. If the oscillated laser beam is converted in wavelength, however, since it is not necessary to take the oscillated laser beam directly out of the resonator, the reflectivity of the exit resonator mirror with respect to the laser beam may be of 99.9% or higher, and the resonator loss L may be less than 1 %.

With the resonator loss L being very small, the oscillation threshold value Pth is not so large even if the value of $\sigma\tau$ is very small, as is apparent from the equation (3) above. Then, because the difference (Pin−Pth) in the equation (2) is of a large positive value and, in addition, the resonator loss L is very small, the intensity Pc of the laser beam oscillated by the solid-state laser in a stable single longitudinal mode at all times is increased. As a result, the wavelength conversion efficiency is high for producing a wavelength-converted wave of high output power.

If the value of $\sigma\tau$ may be small, then no problem arises from an extremely high Nd ion concentration, making it possible to increase the optical absorption coefficient $\alpha$. Since the threshold value Wth is increased by an increased optical absorption coefficient $\alpha$, the upper limit pumping intensity Pin for stable oscillation in a single longitudinal mode at all times is higher. As a consequence, the internal power of the resonator at the time the solid-state laser oscillates in the single longitudinal mode at all times is increased, thus producing a stable high-output-power wavelength-converted wave in the single longitudinal mode. Inasmuch as the solid-state laser oscillates stably in the single longitudinal mode, it can produce a low-noise wavelength-converted wave without suffering a longitudinal mode competition. The laser-diode-pumped solid-state laser is inexpensive and small as no cavity adjustment is required with a piezoelectric element or the like.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 is a graph showing the relationship between the Nd ion concentration of an Nd:YVO$_4$ crystal and the maximum value of a second harmonic output power upon an oscillation in a single longitudinal mode with the pumping laser beam having an intensity of 200 mW.

DETAILED DESCRIPTION OF THE PREFERRED EMBODIMENTS

Figure 1:
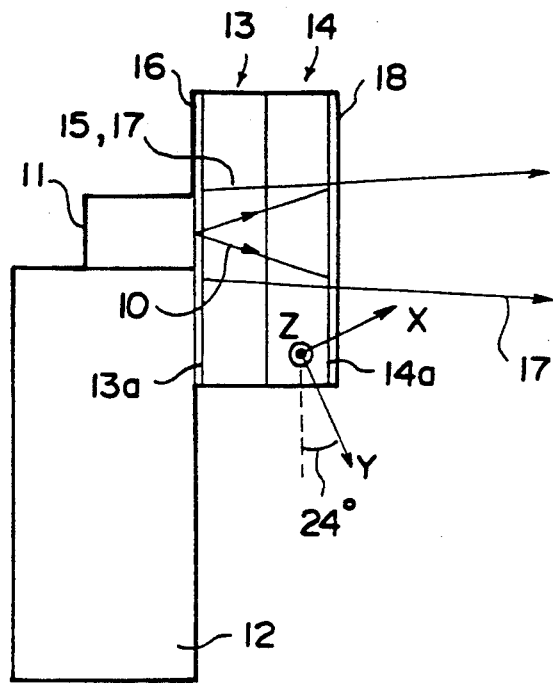
FIG. 1 is a side elevational view of a laser-diode-pumped solid-state laser according to a first embodiment of the present invention.

Like or corresponding parts are denoted by like or corresponding reference characters throughout views.

FIG. 1 shows a laser-diode-pumped solid-state laser according to a first embodiment of the present invention. The laser-diode-pumped solid state laser comprises a semiconductor laser (phased-array laser) 11 for emitting a pumping laser beam 10, a mount 12 supporting the semiconductor laser 11 fixedly thereon, a solid-state laser crystal 13 doped with neodymium (Nd), which is in the form of an Nd:YVO$_4$ crystal, and a KTP crystal 14 intimately held against and fixed to a front end surface (righthand side as shown) of the Nd:YVO$_4$ crystal.

The semiconductor laser 11 is directly fixed on an entrance end surface 13a of the Nd:YVO$_4$ crystal 13. The entrance end surface 13a is secured to the mount 12.

The semiconductor laser or phased-array laser 11 emits a laser beam having a wavelength $\lambda_1$ of 809 nm. The Nd:YVO$_4$ crystal 13 emits a laser beam 15 having a wavelength $\lambda_2$ of 1064 nm when the neodymium atoms of the Nd:YVO$_4$ crystal 13 are excited by the laser beam 10.

The entrance end surface 13a of the Nd:YVO$_4$ crystal 13 is coated with a coating layer 16 for well reflecting the laser beam 15 with a reflectivity of 99.9% or higher and for well passing the pumping laser beam 10 therethrough with a transmittance of 99% or higher. The KTP crystal 14 has a flat exit end surface 14a coated with a coating layer 18 for well reflecting the laser beam 15 with a reflectivity of 99.9% or higher and for well passing a second harmonic 17 (described later) having a wavelength of 532 nm therethrough. The surfaces 13a, 14a serve as respective mirrors which define a resonator therebetween. Therefore, the laser beam 15 is confined between the end surfaces 13a, 14a, i.e., in the resonator, causing laser oscillation. Because of the above resonator structure, the solid-state laser according to the first embodiment suffers a resonator loss of only 1% or less.

The laser beam 15 is applied to the KTP crystal 14, which is of a nonlinear optical material, and converted thereby into a second harmonic 17 having a half wavelength of 532 nm. Since the coating layer 18 is applied to the exit end surface 14a of the KTP crystal 14, substantially only the second harmonic 17 is emitted from the KTP crystal 14.

The KTP crystal 14, which is a biaxial crystal, is cut along a YZ plane as rotated 24° about a Z-axis that is inclined at an angle of 45° to the direction in which the laser beam 15 is linearly polarized. With the KTP crystal 14 thus arranged, phase matching of type II is achieved between the laser beam 15, which is a fundamental wave, and the second harmonic 17.

The Nd:YVO$_4$ crystal has an Nd ion concentration of 4 at %. Therefore, even when the intensity of the pumping laser beam 10 is increased up to a maximum of 200 mW, the laser beam 15 stably oscillates in a single longitudinal mode at all times, and the second harmonic 17 of a high stable output power of 6 mW is produced by the laser-diode-pumped solid-state laser.

An experiment was conducted on a laser-diode-pumped solid-state laser of the same structure as the laser-diode-pumped solid-state laser according to the present invention except that the Nd:YVO$_4$ crystal had an Nd ion concentration of 1 at %. The results of the experiment indicated that the upper limit for the intensity of the laser beam 10 that could oscillate stably in a single longitudinal mode was 4 mW, and the second harmonic output power produced at the time was 0.1 $\mu$W.

Figure 2:
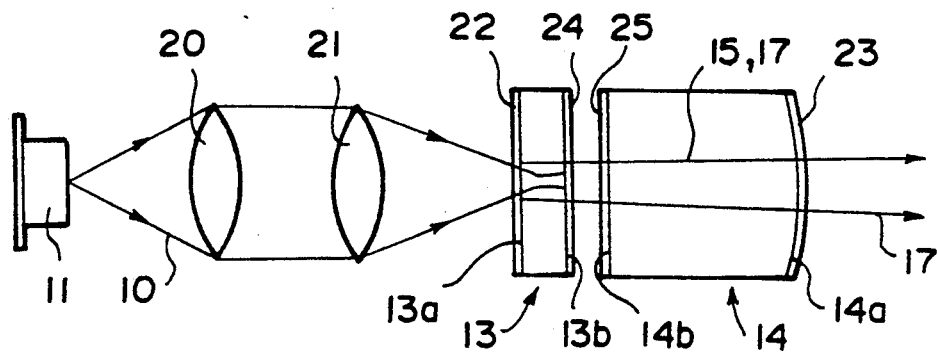
FIG. 2 is a side elevational view of a laser-diode-pumped solid-state laser according to a second embodiment of the present invention.
Figure 3:
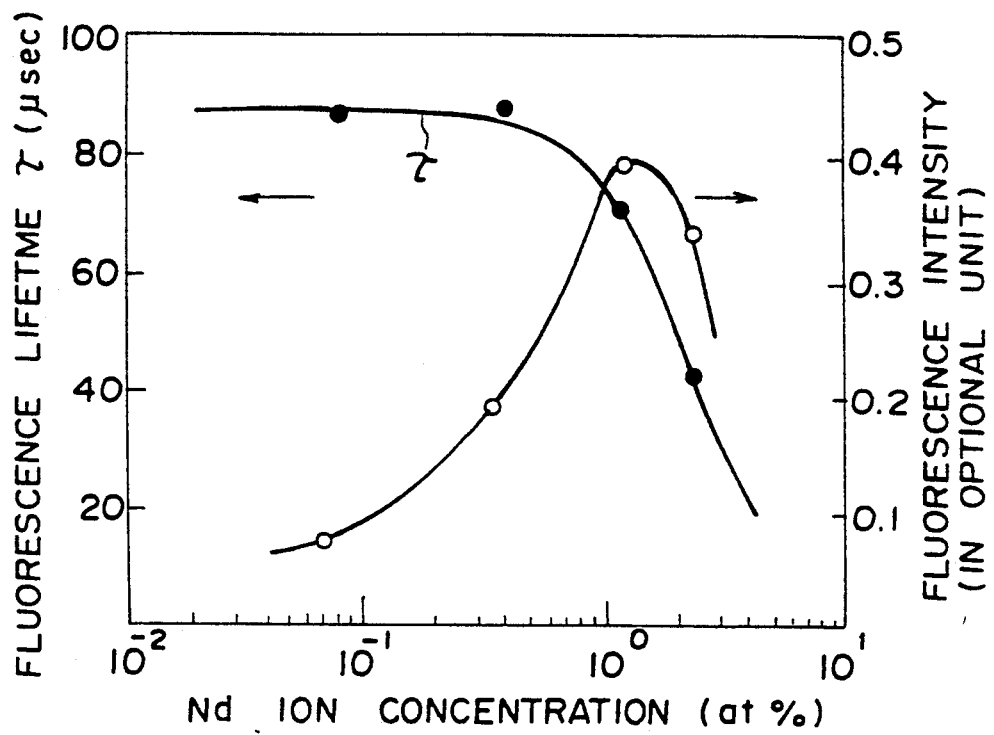
FIG. 3 is a graph showing the relationship between the Nd ion concentration, the fluorescence lifetime, and the fluorescence intensity of an Nd:YVO$_4$ crystal.

FIG. 2 shows a laser-diode-pumped solid-state laser according to a second embodiment of the present invention. Those parts in FIG. 2 which correspond to those shown in FIG. 1 are denoted by corresponding reference characters, and will not be described in detail below.

In the second embodiment, an Nd:YVO$_4$ crystal 13 and a KTP crystal 14 are spaced apart from each other. A pumping laser beam 10 emitted from a semiconductor laser 11 is converted by a collimator lens 20 into a parallel beam which is converged by a condensing lens 21 and applied to the Nd:YVO$_4$ crystal 13.

The Nd:YVO$_4$ crystal 13 has an end surface 13a coated with a coating layer 22 for well reflecting a laser beam 15 having a wavelength of 1064 nm and for well passing the pumping laser beam 10 having a wavelength of 809 nm therethrough. The KTP crystal 14 has a partly spherical end surface 14a coated with a coating layer 23 for well reflecting the laser beam 15 and for well passing a second harmonic 17 having a wavelength of 532 nm therethrough.

The Nd:YVO$_4$ crystal 13 has an opposite end surface 13b coated with a coating layer 24 for well passing the laser beam 15 therethrough. The KTP crystal 14 has an opposite end surface 14b coated with a coating layer 25 for well passing the laser beam 15 therethrough and for well reflecting the second harmonic 17.

Therefore, the laser beam 15 is confined between the surfaces 13a, 14a, causing laser oscillation. The laser beam 15 is applied to the KTP crystal 14, and converted thereby into the second harmonic 17. Since the coating layer 23 is applied to the end surface 14a of the KTP crystal 14, the second harmonic 17 is efficiently emitted from the KTP crystal 14.

FIG. 4 shows the relationship between the Nd ion concentration of the Nd:YVO$_4$ crystal 13 and the maximum value of the second harmonic output power when the laser beam 15 oscillates in a single longitudinal mode in the second embodiment, with the laser beam 10 having an intensity of 200 mW. Study of FIG. 4 indicates that as the Nd ion concentration increases, the output power of the second harmonic 17 which is in the single longitudinal mode at all times greatly increases.

Although certain preferred embodiments of the present invention have been shown and described in detail, it should be understood that various changes and modifications may be made therein without departing from the scope of the appended claims.

What is claimed is:

1. A laser-diode-pumped solid-state laser comprising:
   i) a semiconductor laser for emitting a pumping laser beam;
   ii) a solid-state laser crystal of an ion crystal of a paramagnetic substance doped with neodymium, for producing a laser beam in response to being pumped by said pumping laser beam;
   iii) a resonator for oscillating the laser beam produced by said solid-state laser crystal; and
   iv) an optical wavelength converter in said resonator for converting the wavelength of the oscillated laser beam into another wavelength;
   v) said solid-state laser crystal having a neodymium ion concentration higher than 3 at %.

2. A laser-diode-pumped solid-state laser according to claim 1, wherein said solid-state laser crystal and said wavelength converter are intimately held against and fixed to each other.

3. A laser-diode-pumped solid-state laser according to claim 1, wherein said solid-state laser crystal and said wavelength converter are spaced apart from each other.

4. A laser-diode-pumped solid-state laser according to claim 1, wherein said solid-state laser crystal has a neodymium ion concentration of 4 at %.

* * * * *